United States Patent [19]

Hamisch, Jr.

[11] 4,125,421

[45] Nov. 14, 1978

[54] HAND-HELD LABELER

[75] Inventor: Paul H. Hamisch, Jr., Franklin, Ohio

[73] Assignee: Monarch Marking Systems, Inc., Dayton, Ohio

[21] Appl. No.: 817,086

[22] Filed: Jul. 18, 1977

[51] Int. Cl.[2] .............................................. B32B 31/00

[52] U.S. Cl. .................................... 156/384; 101/288; 156/541; 156/584

[58] Field of Search ........................ 156/384, 584, 541; 101/288, 290, 292, 327, 368, 381

[56] References Cited

U.S. PATENT DOCUMENTS

| | | | |
|---|---|---|---|
| 1,665,467 | 4/1928 | Miller | 101/288 |
| 3,408,931 | 11/1968 | Austin | 101/318 |
| 3,440,123 | 4/1969 | Hamisch | 156/384 |
| 3,656,430 | 4/1972 | Olsson | 101/288 |
| 3,911,817 | 10/1975 | Becker et al. | 101/288 |
| 3,957,562 | 5/1976 | Hamisch | 156/384 |
| 4,057,452 | 11/1977 | Sato | 156/384 |

FOREIGN PATENT DOCUMENTS 2,530,346 1/1977 Fed. Rep. of Germany.

*Primary Examiner*—Caleb Weston

*Attorney, Agent, or Firm*—Joseph J. Grass

[57] ABSTRACT

Disclosed is a hand-held labeler or apparatus for printing and applying pressure sensitive labels. The apparatus has a housing, a rigid, metal, frame plate mounted by the housing, a platen and a cooperating print head, a delaminator for delaminating printed labels from the web of supporting material on which the labels are carried, an applicator for applying the printed labels, a feed wheel having teeth for engaging and advancing the web, a manually operable actuator drivingly connected to the feed wheel and the print head, a brake, and an ink roll for inking the print head. The apparatus also includes a feed wheel assembly having a feed wheel driven by a pawl and ratchet mechanism. The pawl and ratchet mechanism is adjustably connected to the feed wheel. There is also disclosed an arrangement by which the print head can be tripped or fires after the actuator is moved through a predetermined distance. The apparatus has gears which are coupled through a lost-motion connection. When the actuator and one of the gears have moved through a predetermined distance a spring is released to cause the other gear to move the print head into printing cooperation with the platen.

17 Claims, 16 Drawing Figures

FIG-2
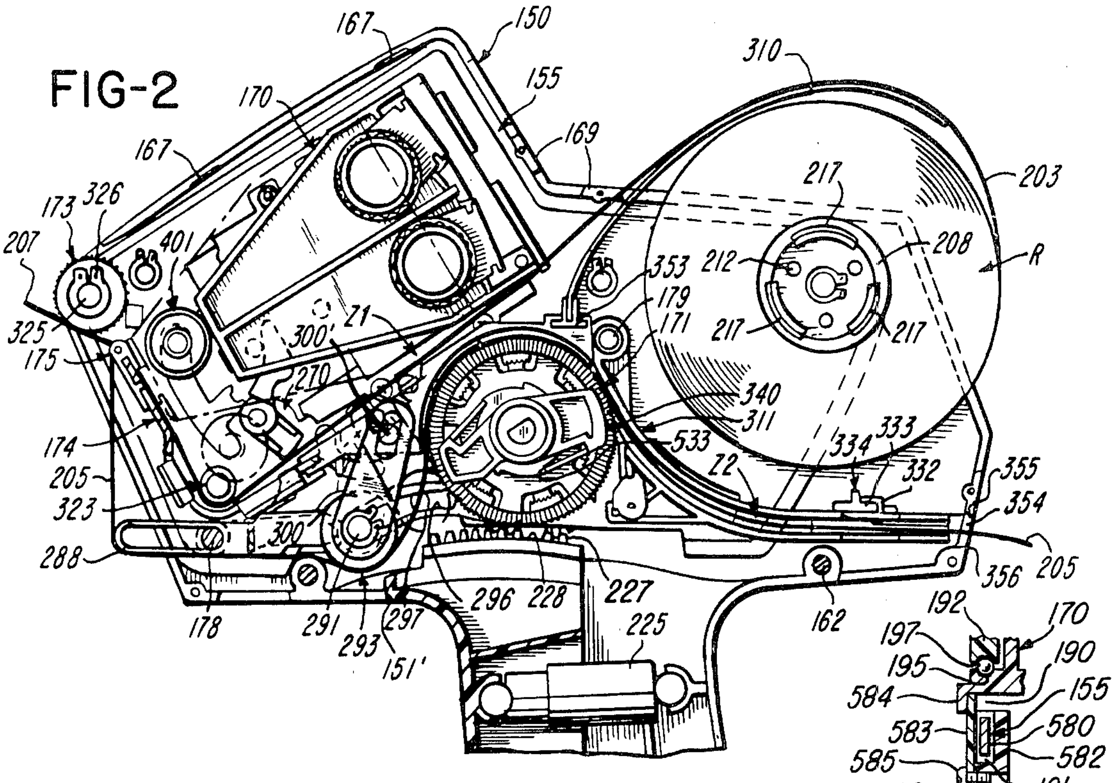
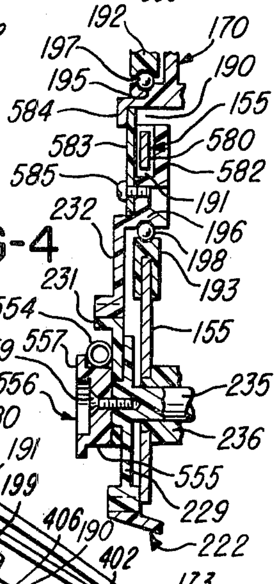
FIG-4
FIG-3
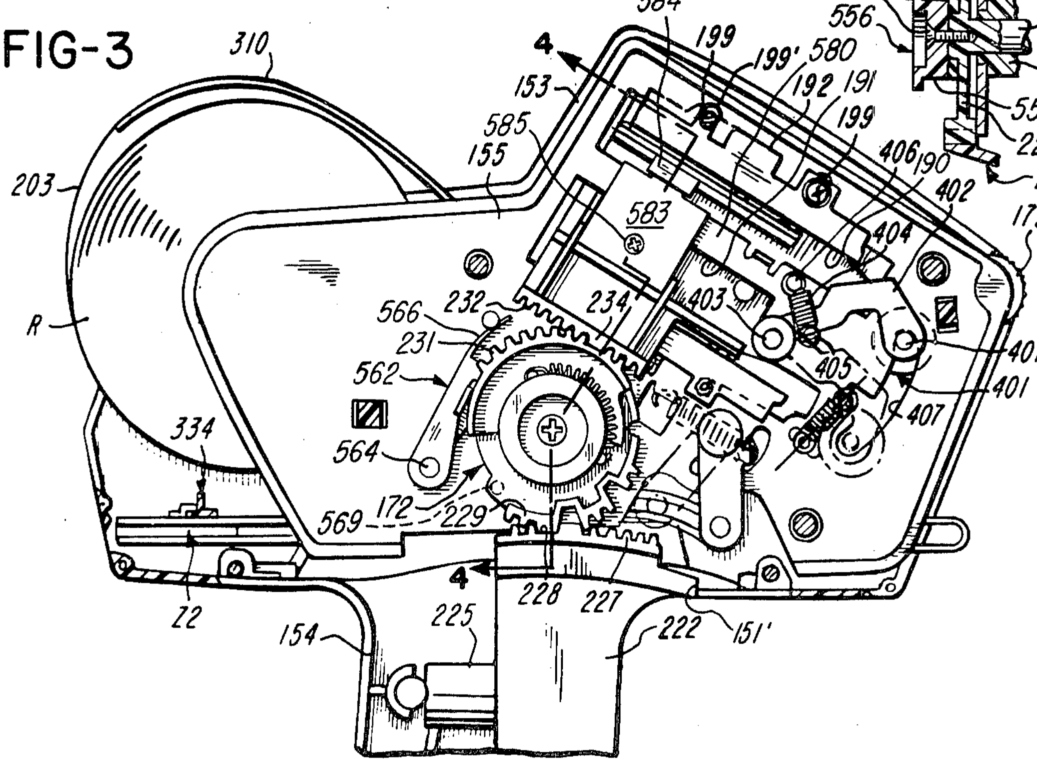

HAND-HELD LABELER

BACKGROUND OF THE INVENTION

1. Field of the Invention

This invention relates to the art of label printing and applying apparatus.

2. Brief Description of the Prior Art

U.S. Pat. No. 1,665,467 to David B. Miller dated Apr. 10, 1928 discloses a stamping device in which a pivotally mounted hammer is tripped into printing cooperation with a marking stamp.

U.S. Pat. No. 3,408,931 to Charles C. Austin dated Nov. 5, 1968 discloses a hand-held label printer in which a print head is mounted for straight line reciprocating movement. This patent discloses cocking means responsive to an actuator for moving the print head from printing to a retracted position during the cycle, a detent for holding the print head in the retracted position during a subsequent part of the cycle, and trip means responsive to the actuator at or near the end of the cycle to disengage the detent, thereby permitting a spring to snap the print head into printing position.

Published German patent application No. P 23 45 249.5-27 (2530346) and its corresponding U.S. Pat. No. 4,072,105 of Meto International GmbH disclose a hand-held labeler having an actuating lever and a spring-urged print head lever. The spring may be cocked by swinging the actuating lever up to the point of reaching a spring force which is greater than the maximum of resistance opposed to the movement of the printing mechanism toward the platen. When this occurs, the print head will be snapped against the platen with constant force independent of the force or speed of movement of the actuator level.

U.S. Pat. No. 3,911,817 to Werner Becker et al dated Oct. 14, 1975 discloses a device for printing and dispensing labels in which a printing mechanism and a label strip advancing mechanism are actuated by movement of a secondary lever and the secondary lever is moved by a primary lever only after actuation of the primary lever to exceed a predetermined biasing force tending to maintain the secondary lever stationary.

U.S. Pat. No. 3,957,562 to Paul H. Hamisch, Jr. dated May 18, 1976 discloses a hand-held labeler having a frame with a handle, an actuator disposed at the handle, a gear segment carried by the actuator, a gear having a gear segment meshing with the actuator gear segment and another gear segment meshing with a print head gear, movement of the actuator effects direct movement of the print head through the gears without any lost motion. The labeler also includes a platen with which the print head is cooperable, a delaminator for delaminating labels, an applicator for applying printed labels and a pawl and ratchet mechanism effective when the actuator is released to advance the web. Other prior art disclosing hand-held labelers, in which the printing mechanism is triggered to control impression, are German Offenlegungsschrift No. 2,656,862 and German Offenlegungsschrift No. 2,729,097.

SUMMARY OF THE INVENTION

This invention relates to a hand-held labeler in which the print head is connected to the actuator through gearing and a lost-motion connection. When the actuator is moved through a predetermined distance from an initial position to an another position, there is lost motion between the gears until the actuator has moved through a predetermined increment through the lost-motion connection. The other gear is held in the initial position by a pawl or latch until the pawl is tripped. A spring is used to urge the print head into printing cooperation with the platen and another spring is used to return the print head, the gears and the actuator to their initial positions and to advance the label carrier web as the actuator moves between the actuated position and the initial position following release of the actuator.

The labeler also includes an arrangement to prevent the print head from becoming dislocated from the frame when the labeler is impacted, such as when the labeler is dropped on the floor.

BRIEF DESCRIPTION OF THE DRAWINGS

FIG. 2 is a partly broken away side elevational view of the apparatus with a removable housing section removed for clarity;

FIG. 3 is a fragmentary elevational view of the other side of the apparatus shown in FIG. 2;

FIG. 4 is a sectional view taken along line 4—4 of FIG. 3;

DESCRIPTION OF THE PREFERRED EMBODIMENT

Figure 1:
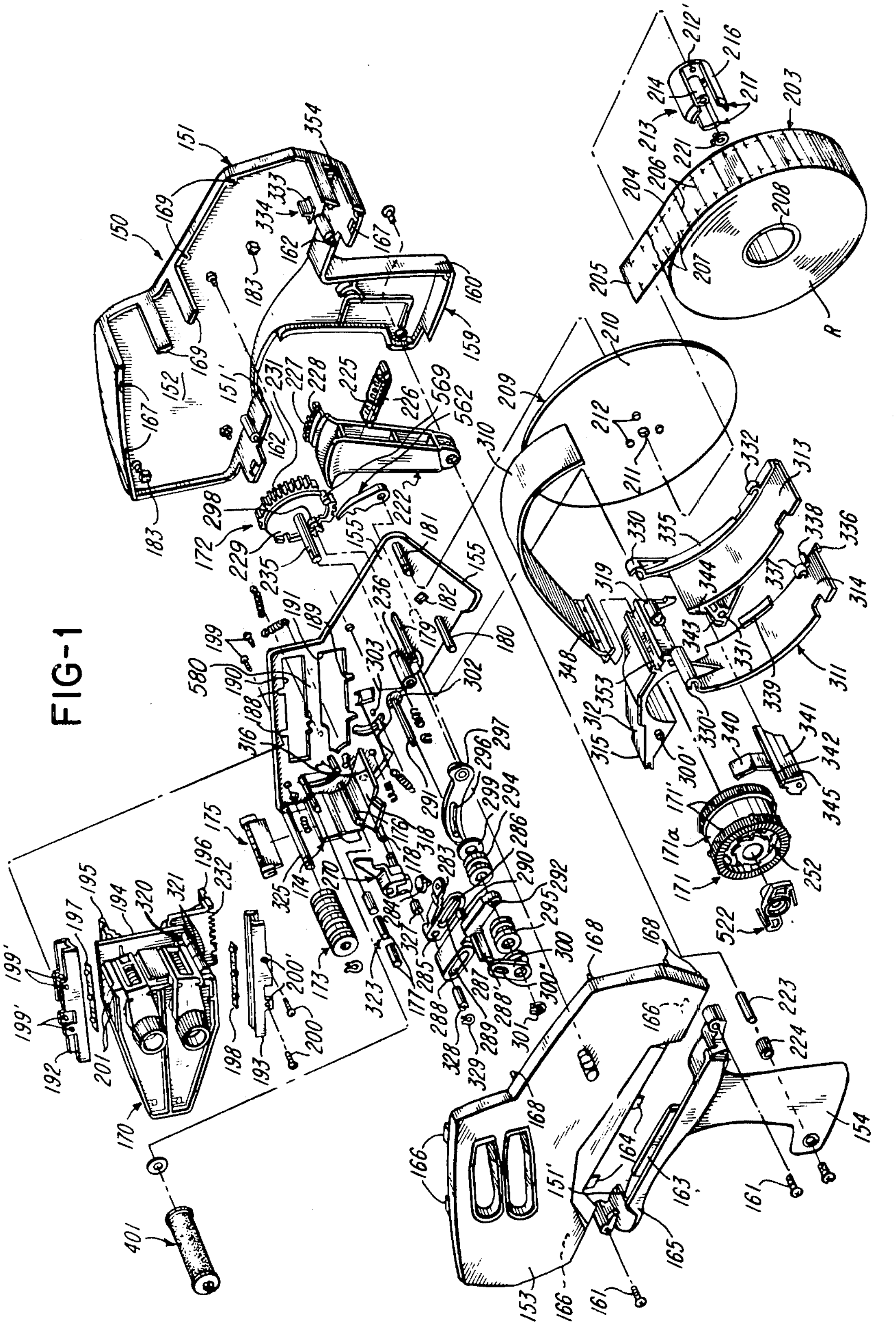
FIG. 1 is an exploded perspective view of an embodiment of label printing and applying apparatus.

With reference to FIG. 1, there is shown a label printing and applying apparatus generally indicated at 150. The apparatus 150 has a frame generally indicated at 151 which is shown to comprise a frame or housing having housing sections 152, 153 and 154 and a subframe comprising a single, rigid, metal frame plate 155. The housing is essentially closed. The frame 151 has a handle generally indicated at 159 comprised in part of a handle portion 160 and in part of the frame section 154. The housing section 154 is secured to the housing section 152 by screws 161 received in respective threaded holes 162. The frame section 153 is positioned in front of a lip 163 of the section 154 and projections 164 on the section 153 extend behind a wall 165. The section 153 is connected to the section 152 by snapfit connections including generally snap-shaped flexible resilient members 166 engageable in respective undercut recesses 167 in the section 152. The section 153 is also provided with locating studs 168 received in respective recesses 169 of the section 152.

The frame plate 155 mounts a print head 170, a feed wheel 171, a gear assembly 172, an applicator 173 shown to be in the form of a roll, a platen 174, a delaminator 175, a mounting pin 176 and a plurality of rollers 177, mounting posts 178, 179, 180 and 181, and a support 236.

The frame plate 155 is provided with two spaced-apart precisely located rectangular holes in which respective square mating locating pins or studs 183 are received. There are three identical hold-down connections which secure the frame plate 155 to the housing section 152.

The frame plate 155 has a pair of elongated cutouts or open-ended slots 188 and a pair of oppositely facing elongated cutouts or open ended slots 189. The slots 188 and 189 communicate with larger respective cutouts 190 and 191. Oppositely facing ball tracks 192 and 193 are received in respective cutouts 190 and 191. The print head 170 comprises a print head frame 194 having a pair of oppositely facing ball tracks 195 and 196. A ball bearing strip 197 is received in mating ball bearing tracks 192 and 195 and a ball bearing strip 198 is received in mating ball bearing tracks 193 and 196. The ball tracks 192 and 193 are shown to be generally channel-shaped in construction. When the ball tracks 192 and 193 are in the position as shown in FIGS. 3 and 4, the ball tracks 192 and 193 are received by the frame plate 155. Threaded fasteners 199 extend through the cutouts 188 and are threadably received in holes 199' in the ball track 192. Similarly, threaded fasteners 200 extend through cutouts 189 and are threadably received in holes 200' in the ball track 193. The print head 170 is capable of printing two lines of data in that the print head 170 has two lines of printing bands 201.

The apparatus 150 is shown to utilize a composite web 203. The composite web 203 of label material 204 is releasably adhered to supporting a backing material 205. The label material 204 is cut transversely by butt cuts or slits 206 extending all the way across the web 204 of label material, thereby separating the label material 204 into a series of end-to-end labels 207. The composite web 203 can be wound onto a circular cylindrical core 208 composed of paperboard or other suitable material. The feed wheel 171 has a plurality of pairs of transversely spaced-apart teeth 171' which engage the supporting material web 205. The composite web roll R is mounted on a real generally indicated at 209. The reel 209 is comprised of a generally flat disc 210 having a central hole 211. Disc 210 has a plurality of equally spaced-apart pins 212 disposed at equal distances from the central hole 211. The reel 209 also includes a hub generally indicated at 213. The hub 213 has a central tubular hub portion 214 joined to an end wall. The pins 212 are received in mating holes 212' in the end wall, thereby keying the disc 210 and the hub 213 for rotation together as a unit. Spaced outwardly from the hub portion 214 and joined integrally to the end wall are a plurality of flexible, resilient, cantilever mounted fingers 216 having projections 217. A retainer 221 received by the marginal end of the shaft 181 prevents the reel 209 from shifting off the post or shaft 181 and prevents the hub 213 from separating from the disc 210 so that the pins 212 do not loose engagement with the holes 212'.

An actuator generally indicated at 222 is shown to take the form of a pivotally operated lever mounted by support structure including a pivot pin 223 received in an eccentric 224 in the form of a sleeve. The actuator 222 is urged in a counterclockwise direction (FIGS. 1 and 2) by a spring assembly 225 which includes a compression spring 226.

The actuator 222 carries a first member, namely, a gear or gear section 227 having an opening 228 provided by a missing tooth. The gear section 227 is in meshing engagement with a second member, namely, gear section or segment 229 of the gear assembly 172. The gear assembly 172 also has a gear section or segment 231 in meshing engagement with the gear section or rack 232 formed integrally with the print head frame 194. Assuming the handle 159 is being held in the user's hand, the user's fingers can operate the actuator 222 to pivot the actuator 222 clockwise (FIGS. 1 and 2) against the force of the spring 226 in the spring device 225, thereby causing the gear segment 229 to rotate counterclockwise. Sections 152 and 154 have stops 151'.

A drive shaft 235 is molded integrally with the gear segment 229. The support 236, in the form of a tube or tubular bearing, is suitably secured in a hole 237' (FIG. 9) in the frame plate 155.

A brake 270 includes a brake member 283 which has a brake shoe 284 composed of a flexible resilient material. During use of the apparatus, the brake member 283 is stationary. However, during loading of the composite web 203, the brake member 283 can be moved manually to its ineffective position. The brake member 283 is integrally joined by a hub 285 to a slotted arm 286. The hub 285 is pivotally mounted on the post 178. The arm 286 has an elongated slot 287. A slide 288 has an elongated slot 289 which receives the post 178 and a pin 290 secured to the arm 286 to provide a pin-and-slot connection. The slide 288 has a finger-engageable projection 288' by which the slide 288 can be moved. As the slide 288 moves in one direction, the pin 290 cooperates with the slot 287 to pivot the arm 286 and the brake member 283 counterclockwise. A shaft 291 extends through a bore 292 in the slide 288.

The shaft 291 mounts a roll 293 comprised of a roll member 294 on one side of the slide 288 and a roll member 295 on the other side of the slide 288. The shaft 291 also passes through an elongated arcuate slot 296 of an arm 297 which is pivotally connected to a pin 298 of the gear segment 229. A washer 299 (FIG. 1) is disposed on the shaft 291 between the roll member 294 and the arm 297 and a retractable guide 300 is disposed on the shaft 291 between the roll member 295 and a retainer 301 secured to the marginal end of the shaft 291. Guide section 312 has an integral pin 300' received in an elongated slot 300'' in the guide 300. The shaft 291 is secured to an arm 302 pivotally mounted on a stud 303 carried by the frame plate 155.

From the place where the composite web 203 is paid out of the roll, it passes over and in contact with a resilient device 310 in the form of a curved leaf spring. The resilient device 310 deflects when the feed wheel 171 is advancing the composite web 203 and after the brake 270 is applied the device 310 gradually returns as additional web 203 is caused to be paid out of the supply roll R. Track structure generally indicated at 311 includes guide track sections 312, 313 and 314. The track section 312 has a forked end 315 which is received by marginal end 316 of an extension 318 of the platen 174. The track section 312 has a short tubular portion 319 which is received by the post 179. Accordingly, the track section 312 is securely held in position relative to the frame plate 155 by the marginal end 316 and by the post 179. After passing in contact with the resilient device 310, the composite web 203 enters a first zone Z1 above the track structure 312 and below the print head 170. The print head 170 carries a roll 320 comprised of a plurality of for example, three rollers 321 rotatably mounted on a shaft 322 mounted on the print head 170. The rollers 321 deflect the composite web 203 into contact with the track section 312 as the print head 170 moves. From the zone Z1 the composite web 203 passes partly around a roll generally indicated at 323 which is comprised of three rollers 177. After the composite web 203 passes around the roll 323, a label 207 of the composite web 203 is disposed between the platen 174 and the print head 170. FIG. 2 shows one of the labels 207 as being almost entirely delaminated from the supporting material web 205 and ready to be applied by applicator 173. The applicator 173 is shown to comprise a roll rotatably mounted on a post 325 secured to the frame plate 155, although other types of applicators can be used instead if desired. A removable retainer 326 maintains the applicator 173 on the post 325. In the loading position shown in FIG. 2, the composite web 203 passes partly around an end of the slide 288 and partly around the roll 293 and from there partly around the feed wheel 171. The shaft 178 carries a roller 327 (FIG. 1) between the hub 285 and the frame plate 155 and a roller 328 disposed between the slide 288 and a retainer 329.

The track section 313 cooperates with the track section 314 to provide a discharge chute at a zone Z2 through which the supporting material web 205 exits. The track section 313 has a pair of spaced-apart tubular portions 330 and 331 received respectively by posts 179 and 180. The track section 313 has an integrally formed curved retaining bracket 332 which passes partly around a flange 333 of a post 334. Thus, the track section 313 is secured to the frame plate 155 and to the housing section 152. The track section 313 includes a channel-shaped portion 335 to which the connector 332 is joined. The track section 314 has an offset flange 336 which fits into the channel-shaped portion 335 to interlock the track section 314 with the track section 313. The track section 314 also has a curved retaining bracket 337 which extends partly around the flange 333 and has a pair of spaced-apart offset flanges 338 and 339 which fits against the outside of the channel-shaped portion 335. A tubular portion 330′ secures one end of the track section 314 to the frame plate 155 and the flanges 336, 338 and 339 interlock the track sections 313 and 314. The track structure 311 also includes a stripper 340 which engages the smooth annular outer surface 171*a* of the feed wheel 171. The stripper 340 is provided with a pair of offset flanges 341 and 342 which fits respectively into grooves 343 and 344 in the track section 313. The post 179 is longer than the combined lengths of the tubular portions 319, 330 and 330′ and thus a projection 345 formed integrally with the stripper 340 can fit snugly into the end of the tubular portion 331.

As best shown in FIG. 1, the resilient device 310 has a connector 348 received in an undercut recess 353 in the track section 213. The housing is shown to have an opening 354 (FIG. 2) having relatively sharp external edges 355 and 356 which can serve as cutting edges for removing the excess web 205.

With reference to FIG. 3, ink roll 401 is shown to be rotatably mounted on a post 401′ secured to an arm 402. The arm 402 is pivotally mounted on a post 403 secured to the frame plate 155. A tension spring 404 is connected at one end to an upstanding tab 405 on the arm 402 and its other end to a post 406 mounted on the frame plate 155. The arm 402 and the ink roll 401 are shown in one extreme position by solid lines in which the print head 170 is in its retracted position and by phantom lines in which the print head 170 is in its extended or printing position. The shaft 401′ extends through an arcuate slot 407 in the frame plate 155.

Figure 5:
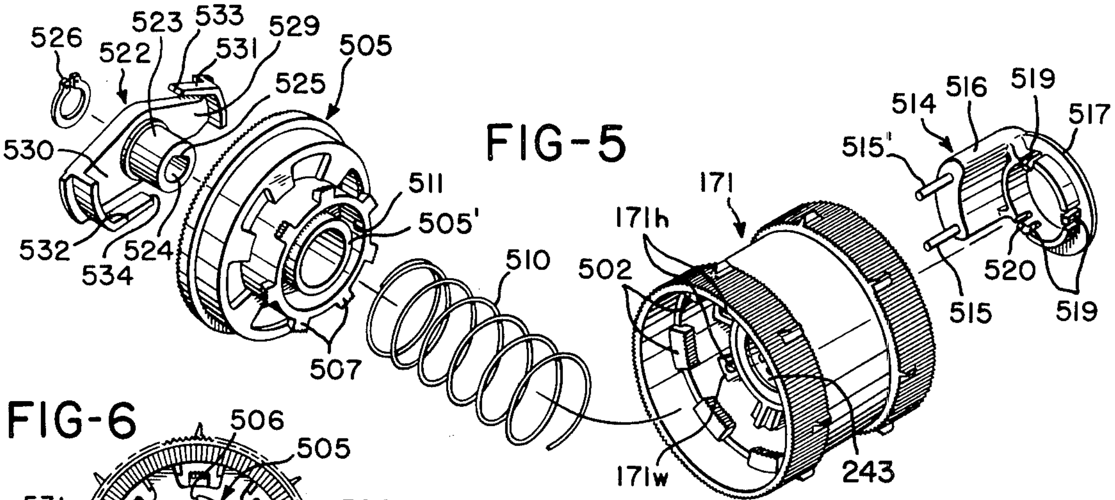
FIG. 5 is an exploded perspective view of the feed wheel together with a quick-change clutching and declutching mechanism, with the axis curved for clarity.

With reference initially to FIG. 5, there is shown the feed wheel 171 which is secured against relative rotation to the rolling-contact type one-way clutch 243. The feed wheel 171 has a hub portion 500. The hub portion 500 has an annular flange 501 against which one end of the clutch 243 abuts. The feed wheel 171 is provided with a plurality of equally spaced-apart toothed segments 502 arranged in an annular row and disposed in a common plane. The toothed segments 502 have a plurality of teeth formed by ridges 503 and intervening grooves 504. A drive wheel is shown to comprise a ratchet wheel 505 having a plurality of teeth 506 disposed at equally spaced-apart intervals. The ratchet wheel 505 has a hub portion 505′, both axially slidably and rotatably mounted on outer circular cylindrical surface 246 of the support 236. Hence the feed wheel 171 and the ratchet wheel 505 are coaxially mounted for relative axial shifting and rotational movement. The ratchet wheel 505 has a plurality of equally spaced-apart toothed segments 507 arranged in an annular row and disposed in a common plane. The toothed segments 507 have ridges 508 and intervening grooves 509. The annular extent or width of the segments 507 is slightly less than the annular extent or width of the segments 502. The number of segments 507 is equal to the number of segments 502, and the pitch of the ridges 503 and grooves 504 is equal to the pitch of the ridges 508 and grooves 509. Accordingly, the ratchet wheel 505 and the feed wheel 171 can be readily assembled as well be described below in greater detail.

Figure 9:
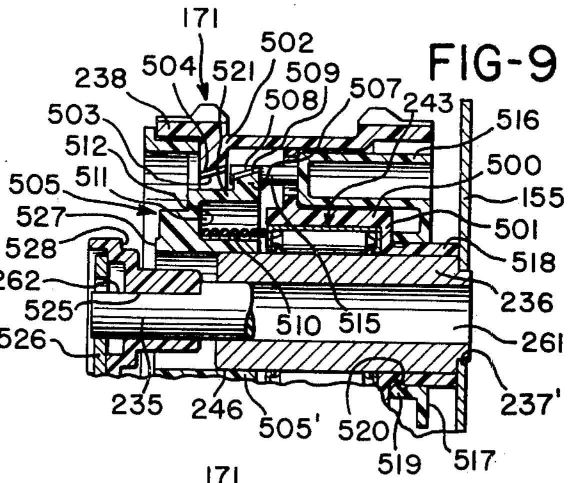
FIG. 9 is a fragmentary sectional view showing the clutch members declutched to enable rotation of the ratchet wheel relative to the feed wheel.

A helical, compression, clutch spring 510 is shown to be disposed about hub portion 505′ of the ratchet wheel 505 and to be received in a recess 511. One end of the clutch spring 510 abuts against an annular flange 512 of the ratchet wheel 505 and the other end of the clutch spring 510 abuts against one end of the clutch 243. The spring 510 normally urges the clutch member 507 into clutching engagement with the clutch member 502 as shown in FIG. 9. However, to effect change of position of the ratchet wheel 505 relative to the feed wheel 171, the user uses his fingers to push on the knurled bead 513 on the outer surfaces of the ratchet wheel 505 and pushes the ratchet wheel from the position shown in FIG. 9 to the position shown in FIG. 8, thereby compressing the clutch spring 510. In this axially shifted position of the ratchet wheel 505 relative to the feed wheel 171, thc user can rotate the ratchet wheel 505 relative to the feed wheel 171 to a new position of adjustment, and when in this position the user simply stops pushing on the bead 513 and the spring 510 will thereupon urge the ratchet wheel 505 axially until the toothed members 507 clutch with the toothed member 502 in the new selected position. A change of position of the feed wheel 171 and the ratchet wheel 505 relative to each other will change the position to which the composite web 203 is advanced relative to the platen 174 and relative to the delaminator 175.

Figure 8:
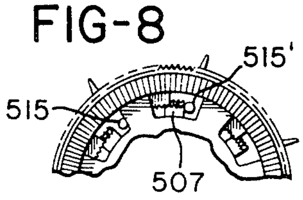
FIG. 8 is a fragmentary elevational view showing toothed clutch members of the mechanism in one extreme selected position.

In order to prevent the ratchet wheel 505 and the feed wheel 171 from being moved to relative positions in which respective toothed members 502 and 507 are out of alignment and are disassembled from each other by the force exerted by the clutch spring 510, thereiis provided a stop device 514 having a pair of stops 515 and 515'. The stops 515 and 515' extend in an axial direction and are secured to a hollow body 516 received by the feed wheel 171. The stops 515 and 515' extend through slots or holes 171*h* in webs 171*w* which join the hub portion 518 and rim 238, thereby preventing rotation of the stop device 514 relative to the feed wheel 171. An annular ring 517 secured to the body 516 is received about a hub portion 518 of the feed wheel 171. The ring 517 has a plurality of flexible resilient fingers 519 each of which has a respective projection 520. The spring fingers 519 prevent movement of the stop member 514 toward the plate 155 to a position in which stops 515 and 515' would be out of the path of the toothed members 507. As best shown in FIG. 8, in which the clutch members 507 are in one extreme position relative to the clutch members 502, the stop 515' prevents further clockwise movement of the clutch members 507 relative to the clutch members 504. When a side surface of the clutch member 507 which is disposed between the stops 515 and 515' contacts the stop 515 it will prevent further counterclockwise movement of the ratchet wheel 505 relative to the feed wheel 171, thereby preventing axial misalignment of clutch members 507 and 502.

The clutch members 502 extend radially inwardly from rim 238 of the feed wheel 171 and the respective ridges 503 and grooves 504 are inclined in one direction relative to the axis of the feed wheel 171 as best shown in FIGS. 8 and 9. The clutch members 507 are shown to be secured to a web 521 joined to the annular wall 512, and the clutch members 507 extend in a radial outward direction. The ridges 508 and grooves 509 are inclined relative to the axis of the feed wheel 171 but in the same direction as the ridges 503 and the grooves 504. When the ratchet wheel 505 is in the position with respect to the feed wheel 171 shown in FIG. 10, the clutch members 502 and 507 are clutched together by the action of the clutch spring 510.

Figure 6:
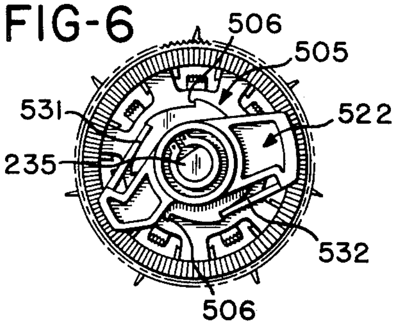
FIG. 6 is an end elevational view showing many of the components in FIG. 5 in a position of partial assembly.
Figure 7:
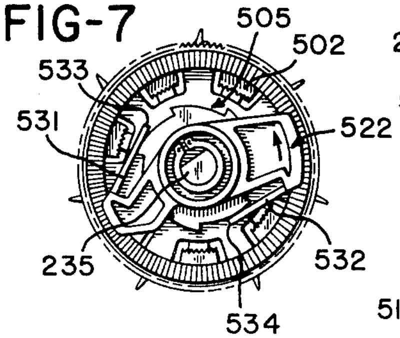
FIG. 7 is an end elevational view of the quick-change mechanism showing drive pawls moving toward their retracted positions.
Figure 10:
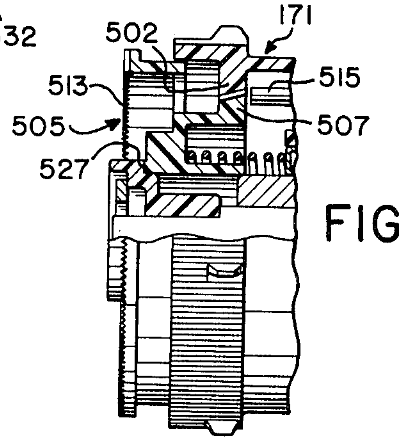
FIG. 10 is a fragmentary elevational view partly in section showing the clutch members in clutched position.

Pawl structure 522 is shown to include a hub 523. The hub 523 has a non-circular hole 524 with a flat 525. The hub 523 is received by the shaft 235 which has a flat 262 (FIG. 12) which faces the flat 525. The shaft 235 is received in the elongated hole or bore 261. A grip ring 526 is received by the drive shaft 235 and retains the pawl structure 522 in position. It is noted that end portion 527 of the ratchet wheel 505 abuts annular face 528 (FIG. 8) of the pawl structure 522 when the clutch members 502 and 507 are in meshing engagement as shown in FIG. 10. The pawl structure 522 includes a pair of arms 529 and 530 secured to the hub 523. The arms 529 and 530 carry respective drive pawls 531 and 532. The drive ends 533 and 534 simultaneously engage respective teeth 506 as best shown in FIG. 5. In driving the feed wheel 171, the pawl structure 522 is initially in the position shown in FIG. 6. Thereafter, as the drive shaft 235 is rotated, the pawl structure 522 moves through a transitory position shown in FIG. 7 until drive ends 533 and 534 move into engagement with the next successive pair of teeth 506. Upon rotation of the drive shaft 235 in the opposite direction, the drive pawls 531 and 532 cause the feed wheel 171 to pull the supporting material web 205, thereby advancing the composite web 203 through a distance equal to one label length. The change of position to which the composite web is advanced can be changed as described above. When the feed wheel 171 has advanced the composite web 203 following the printing operation, only the trailing marginal edge of the leading label 207 is adhered to the web 205. The quick-change clutching and declutching mechanism enables the user to vary the width of the trailing marginal edge of the label which is adhered to the web 205 and also changes the registration of the leading label 207 relative to the platen 174 and the print head 170.

Figure 11:
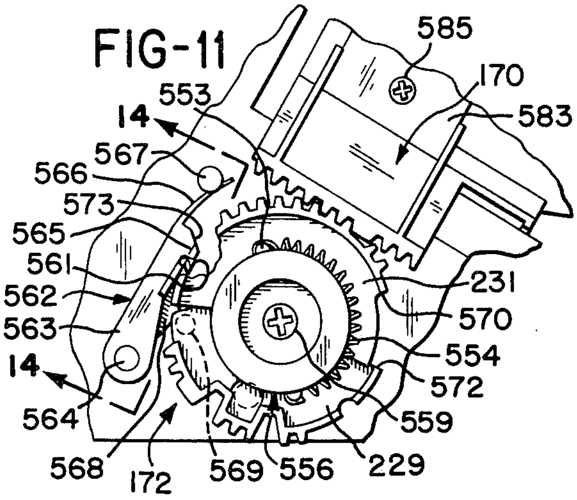
FIG. 11 is a fragmentary view showing one gear segment moved to a position in which the latch is about to be tripped.
Figure 12:
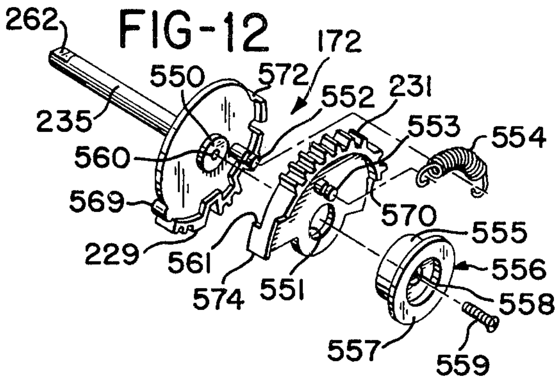
FIG. 12 is a exploded perspective view of the gear assembly.
Figure 14:
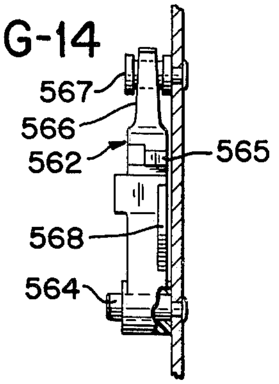
FIG. 14 is a sectional view taken along line 14—14 of FIG. 11.
Figure 13:
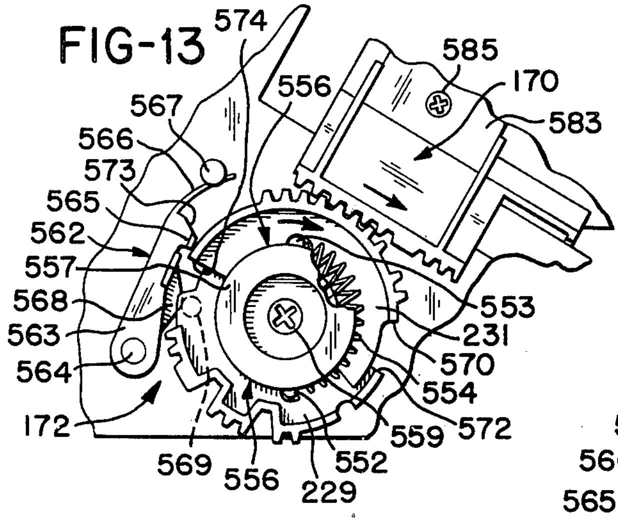
FIG. 13 is a fragmentary view similar to FIG. 11 but showing the latch as having been tripped.

With reference to FIG. 12, the gear segment 229 is shown to have a bearing 550 which is coaxial with the shaft 235. The gear segment 231 has an annular hole 551 by which the gear segment 231 is rotatable on the bearing 550. There is a post 552 on the gear segment 229 and a post 553 on the gear segment 231. A tension spring 554 is connected at its one end portion to the post 252 and at its other end portion to the post 253. The spring 254 is in contact with outer annular surface 555 of a bearing generally indicated at 556. The bearing 556 has an annular flange 557 and a through-hole 558. A screw 559 extends through the hole 558 and is threadably received in an axial hole 560 in the bearing 550. The gear segment 231 has a latch shoulder 561 with which a latch or pawl generally indicated at 562 cooperates. The latch 562 is shown to be one-piece molded plastics construction and has a body 563 pivotally mounted at one end portion on a pin or post 564. The body 563 has a tooth 565 its the other end portion. A leaf spring or spring finger 566 is connected to the other end portion of the body and abuts a pin or post 567. Thus, the tooth 565 is disposed between the posts 564 and 567. The latch 562 also has a cam 568 with which a pin or driver 569 (FIGS. 1, 11 and 13) formed integrally with the gear segment 229 cooperates. In the initial position (FIG. 3) of the gear assembly 172, the spring 554 urges a shoulder 570 of the gear segment 231 into abutment with a shoulder 572 of the gear segment 229. The latch tooth 565 engages the shoulder 561 to prevent rotation of the gear segment 231 in the opposite direction. When the user grips the actuator 222, the gear segment 227 drives the gear segment 229 relative to the gear segment 231. As the gear segment 229 continues to rotate, the spring 554 stretches. When the driver 569 moves from the position shown in FIG. 3 through the position shown in FIG. 11 to the position shown in FIG. 13, the driver 569 has acted on the cam 268 to pivot the latch 562 counterclockwise (FIG. 13), thereby releasing the tooth 565 from engagement with the shoulder 561 allowing the spring 554 to drive the gear segment 231 clockwise (FIG. 13) to urge the print head 170 into printing cooperation with the platen 174. By use of this arrangement, the force with which the print head 170 is driven into cooperation with the platen 174 is essentially independent of the rate at which the user moves the actuator 222. When the actuator 222 is released the return spring assembly 225 returns the actuator 222, the gear segments 229 and 231, and the print head 170 to their initial positions. The tooth 565 has a cam face 573. When the gear section 231 returns to its initial position, portion 574 of the gear segment 231 cooperates with the cam surface 573 to urge the pawl 562 counterclockwise (FIG. 11) to enable the tooth 565 to again be in latching engagement with the shoulder 561 in the position of FIG. 3. As indicated from FIG. 12, the arrangement for providing a lost-motion connection between the gear segments 229 and 231 is relatively simple. Moreover, this arrangement enables the positional relationship of the ratchet wheel to be varied relative to the feed wheel to vary the position to which the labeler is advanced relative to the platen 174 and the delaminator 175.

Figure 15:
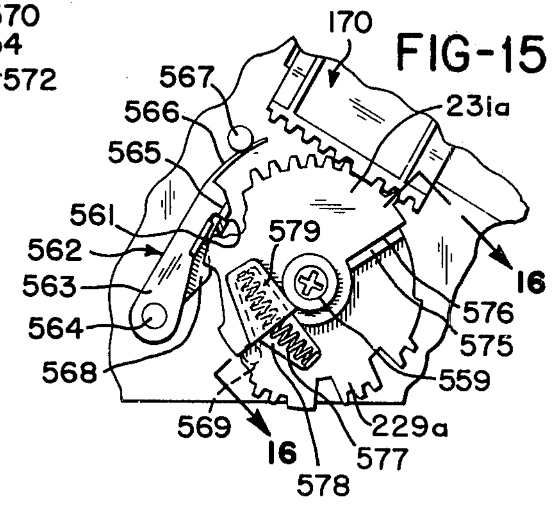
FIG. 15 is a fragmentary view similar to FIG. 11 but showing an alternative embodiment.
Figure 16:
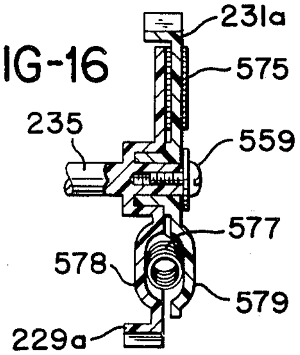
FIG. 16 is a sectional view taken along line 16—16 of FIG. 15.

With reference to FIGS. 15 and 16 there is shown an alternative embodiment of the invention. Gear segments 229*a* and 231*a* are shown in their initial positions. The gear segment 229*a* has a flange 575 against which shoulder 576 of the gear segment 231*a* abuts. A compression spring 577 is received in pockets 578 and 579. The spring 277 bottoms in the pockets 278 and 279. When the gear segment 229*a* is pivoted clockwise (FIG. 15) due to the action of the actuator 222, the driver 569 cooperates with the cam 568 to trip the latch 562 and thus urge the print head 170 into printing cooperation with the platen 174.

With reference to FIG. 4, the pair of ball tracks 192 and 195 and the respective ball bearing 197 are disposed at one side of the opening 190 and the pair of ball tracks 193 and 196 and the respective ball bearing 198 are disposed at one side of the other opening 191. A frame section 580 of the frame plate 155 is disposed between the cutouts 190 and 191. The print head 170 is provided with a pair of members 582 and 583 which straddle the frame section 580 to prevent the print head 170 from becoming dislocated with respect to the frame plate 155, as for example when the labeler 150 is dropped. The member 583 fits underneath a lip 584 and is connected to the print head 170 by a screw 584. There is sufficient clearance between the frame section 580 and the members 582 and 583 to avoid scraping or sliding action therebetween, but the members 582 and 583 are close enough to prevent the print head 170 from popping out of the frame 155 when the labeler is dropped.

Reference may be made to the disclosure in U.S. Pat. No. 3,957,562 for further details of construction and operation, the disclosure of said patent being incorporated herein by reference.

Other embodiments and modifications of this invention will suggest themselves to those skilled in the art, and all such of these as come within the spirit of this invention are included within its scope as best defined by the appended claims.

I claim:

1. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head on the frame for movement into and out of printing cooperation with the platen, means disposed adjacent the platen for delaminating printed labels from the supporting material web, means disposed adjacent the delaminating means for applying printed labels, a feed wheel engageable with the web for advancing the web, means including a drive mechanism for driving the print head into cooperation from the platen and for thereafter driving the feed wheel to advance the just printed label into label applying relationship with respect to the applying means, the drive mechanism including a first gear section movable in response to movement of the actuator, a second gear section meshing with the first gear section, a third gear coupled to the print head, spring means for urging the third gear section into an initial position relative to the second gear section, means for holding the third gear section in the initial position until the actuator has moved to between its initial position and the actuated position, the second gear section being movable relative to the third gear section against the action of the spring means as the actuator moves away from its initial position, and means for releasing the third gear section when the second gear section has moved through a selected distance to enable the spring means to drive the print head into printing cooperation with the platen.

2. Apparatus as defined in claim 1, wherein the drive mechanism further includes a fourth gear section connected to the print head and in mesh with the third gear section, wherein the relatively movable second and third gear sections are mounted coaxially with respect to each other and with respect to the feed wheel, and wherein the drive mechanism further includes a pawl and ratchet mechanism coupled to the feed wheel, the pawl and ratchet mechanism being effective to drive the feed wheel only after the print head has cooperated with the platen.

3. Apparatus as defined in claim 1, wherein the drive mechanism further includes a fourth gear section connected to the print head and in mesh with the third gear section, wherein the drive mechanism further includes a ratchet wheel and a pawl driven by the second gear section for driving the ratchet wheel, the pawl being effective to drive the feed wheel only after the print head has cooperated with the platen, and means for varying the positional relationship of the ratchet wheel relative to the feed wheel to vary the position to which a label is advanced relative to the delaminating means.

4. Apparatus as defined in claim 1, wherein the spring is a tension spring.

5. Apparatus as defined in claim 1, wherein the spring is a compression spring.

6. Apparatus as defined in claim 1, wherein the third gear section is rotatably mounted on the second gear section.

7. Apparatus as defined in claim 1, wherein the drive mechanism includes a shaft secured to the second gear section for rotatably mounting the second gear section, the third gear section being rotatably mounted on the second section, a bearing disposed adjacent the second and third gear sections, the spring being a tension spring and being in supported contact with the bearing, the spring being connected at one end portion to the second gear section and at the other end portion to the third gear section.

8. Apparatus as defined in claim 1, wherein the drive mechanism includes a lost-motion connection between the second and third gear sections.

9. Apparatus as defined in claim 1, wherein the holding means comprises a latch of one-piece molded plastics construction, the latching having a latch shoulder cooperable with a shoulder on the third gear section, and a resilient spring finger for urging the latch shoulder into the path of the gear section shoulder, the releasing means including cam means operated by the second gear section to trip the latch.

10. Apparatus as defined in claim 9, wherein the cam is on the latch and the second gear section has a projection for contacting the cam and tripping the latch, a first post for pivotally mounting the latch, a second post for contacting the spring finger, the latch shoulder being disposed between the first and second posts.

11. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head on the frame for movement into and out of printing cooperation with the platen, means disposed adjacent the platen for delaminating printed labels from the supporting material web, means disposed adjacent the delaminating means for applying printed labels, the frame including a tubular support having an elongated bore, a feed wheel engageable with the web for advancing the web, a rolling-contact type one-way clutch mounted on the support, the clutch being received in and secured against relative rotation to the feed wheel, means including a drive mechanism for driving the print head into cooperation with the platen and for thereafter driving the feed wheel to advance the just printed label into label applying relationship with respect to the applying means, the drive mechanism including a first gear section movable in response to movement of the actuator, a second gear section meshing with the first gear section, a shaft secured to the second gear section, a thid gear section coupled to the print head, spring means for urging the third gear section into an initial position relative to the second gear section, means for holding the third gear section in the initial position until the actuator has moved to between its initial position and the actuated position, the second gear section being movable relative to the third gear section against the action of the spring means as the actuator moves away from its initial position, means for releasing the third gear section when the second gear section has moved through a selected distance to enable the spring means to drive the print head into printing cooperation with the platen, and a pawl and ratchet mechanism including a pawl secured to the shaft and ratchet teeth disposed in an annular array and coupled to the feed wheel.

12. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head on the frame for movement into and out of printing cooperation with the platen, means disposed adjacent the platen for delaminating printed labels from the supporting material web, means disposed adjacent the delaminating means for applying printed labels, a feed wheel engageable with the web for advancing the web, means including a drive mechanism for driving the print head into cooperation with the platen and for thereafter driving the feed wheel to advance the just printed label into label applying relationship with respect to the applying means, the drive mechanism including a first member movable in response to movement of the actuator, a second member driven by the first member, a first gear section driven by a second member, a second gear section carried by the print head, spring means for urging the second member into an initial position relative to the first member, means for holding the second member in the initial position until the actuator has moved to between its initial position and the actuated position, means for releasing the second member when the first member has moved through a selected distance to enable the spring means to drive the print head into printing cooperation with the platen, the drive mechanism being effective in the cycle only after the releasing means has released the second member.

13. Apparatus as defined in claim 12, including means for pivotally mounting the first and second members.

14. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head on the frame for movement into and out of printing cooperation with the platen, means disposed adjacent the platen for delaminating printed labels from the supporting material web, means disposed adjacent the delaminating means for applying printed labels, a feed wheel engageable with the web for advancing the web, means including a drive mechanism for driving the print head into cooperation from the platen and for thereafter driving the feed wheel to advance the just printed label into label applying relationship with respect to the applying means, the drive mechanism including a first member movable in response to movement of the actuator, a second member driven by the first member, spring means for urging one of the members into an initial position, means for holding the one member in the initial position until the actuator has moved to between its initial position and the actuated position, means for releasing the one member when the actuator has moved through a selected distance to enable the spring means to drive the print head into printing cooperationwith the platen, the drive mechanism being effective in the cycle only after the releasing means has released the one member.

15. Apparatus as defined in claim 14, wherein the mounting means mounts the print head for straight line movement.

16. Hand-held apparatus for printing and applying pressure sensitive labels releasably carried on a web of supporting material, comprising: a frame having a handle, an actuator disposed at the handle and movable between an initial position and an actuated position, a platen, a print head, means mounting the print head on the frame for movement into and out of printing cooperation with the platen, means disposed adjacent the platen for delaminating printed labels from the supporting material web, means disposed adjacent the delaminating means for applying printed labels, a feed wheel engageable with the web for advancing the web, means including a drive mechanism for driving the print head into cooperation with the platen and for thereafter driving the feed wheel to advance the just printed label into label applying relationship with respect to the applying means, the drive mechanism including a first gear section movable in response to movement of the actuator, a second gear section meshing with the first gear section, a third gear section coupled to the print head, spring means for urging one of the two gear sections into an initial position relative to the other of the two gear sections, means for holding the one of the two gear sections in the initial position until the actuator has moved to between its initial position and the actuated position, the other of the two gear sections being movable relative to the one of the two gear sections against the action of the spring means as the actuator moves away from its initial position, and means for releasing the one of the two gear sections when the other of the two gear sections has moved through a selected distance to enable the spring means to drive the print head into printing cooperation with the platen.

17. Hand-held apparatus for printing and applying pressure sensitive labels releasably carried on a web of supporting material, comprising: a frame having a handle, an actuator disposed at the handle and movable between an initial and an actuated position, a platen, a print head, means mounting the print head to the frame for movement into and out of printing cooperation with the platen, means disposed adjacent the platen for delaminating printed labels from the supporting material web, a feed wheel engageable with the web for advancing the web, means including a drive mechanism for driving the print head into cooperation with the platen and for thereafter driving the feed wheel to advance the just printed label into label applying relationship with respect to the applying means, the drive mechanism including a first gear coupled to the actuator, a second gear for driving the print head and a lost-motion connection between the first and second gears, first spring means for urging the print head into printing cooperation with the platen in response to movement of the first gear through a predetermined distance, and second spring means for returning the actuator, the first and second gears and the print head to their initial positions, the drive mechanism further including a pawl and ratchet mechanism coupled to the feed wheel and operable by the second spring means only when the actuaor has been moved to the actuated position and released.

* * * * *

UNITED STATES PATENT AND TRADEMARK OFFICE
CERTIFICATE OF CORRECTION

PATENT NO. : 4,125,421

DATED : November 14, 1978

INVENTOR(S) : PAUL H. HAMISCH, JR.

It is certified that error appears in the above-identified patent and that said Letters Patent are hereby corrected as shown below:

Column 3, line 57, "real" should be --reel--. Column 10, line 59, "latching" should be --latch--. Column 11, line 26, "thid" should be --third--.

Signed and Sealed this

*Twentieth* Day of *March 1979*

[SEAL]

*Attest:*

RUTH C. MASON
*Attesting Officer*

DONALD W. BANNER
*Commissioner of Patents and Trademarks*